(12) United States Patent
Hedrick

(10) Patent No.: US 10,633,105 B2
(45) Date of Patent: *Apr. 28, 2020

(54) PRECISION OPERATOR FOR AN AIRCRAFT AUTOTHROTTLE OR AUTOPILOT SYSTEM WITH ENGINE PERFORMANCE ADJUST

(71) Applicant: Geoffrey S. M. Hedrick, Malvern, PA (US)

(72) Inventor: Geoffrey S. M. Hedrick, Malvern, PA (US)

(*) Notice: Subject to any disclaimer, the term of this patent is extended or adjusted under 35 U.S.C. 154(b) by 54 days.

This patent is subject to a terminal disclaimer.

(21) Appl. No.: 15/900,542

(22) Filed: Feb. 20, 2018

(65) Prior Publication Data

US 2018/0170567 A1 Jun. 21, 2018

Related U.S. Application Data

(63) Continuation-in-part of application No. 15/554,642, filed as application No. PCT/US2016/045002 on Aug. 1, 2016, now Pat. No. 10,099,795.

(60) Provisional application No. 62/250,819, filed on Nov. 4, 2015, provisional application No. 62/336,200, filed on May 13, 2016.

(51) Int. Cl.
*G01C 23/00* (2006.01)
*B64D 31/06* (2006.01)
*G07C 5/08* (2006.01)

(52) U.S. Cl.
CPC ........... *B64D 31/06* (2013.01); *G07C 5/0816* (2013.01)

(58) Field of Classification Search
CPC combination set(s) only.
See application file for complete search history.

(56) References Cited

U.S. PATENT DOCUMENTS

| 4,567,786 A | 2/1986 | Sakurai |
| 5,152,360 A | 10/1992 | Haefner et al. |
| 5,188,316 A | 2/1993 | Dressler et al. |
| 2002/0131864 A1* | 9/2002 | Vos .................. B60W 10/06 416/25 |

(Continued)

FOREIGN PATENT DOCUMENTS

| DE | 197 12 153 | 10/1998 |
| EP | 0137610 | 4/1985 |

(Continued)

OTHER PUBLICATIONS

Wilamowski et al: "The Industrial Electronics Handbook", Mar. 4, 2011, 4 pages.

(Continued)

*Primary Examiner* — Adam M Alharbi
(74) *Attorney, Agent, or Firm* — Cozen O'Connor

(57) ABSTRACT

An autothrottle system for an aircraft includes a motor, actuator assembly, and position sensor operatively connected between the motor and a moving portion of the actuator assembly. An electronic controller is configured to control the motor to move the actuator assembly to actuator positions based at least on position information from the position sensor to move the throttle lever to lever positions. When a surge condition is detected the autothrottle increases the throttle lever in a regulated manner for optimal performance over the different regions of an engine power output.

10 Claims, 6 Drawing Sheets

(56) References Cited

U.S. PATENT DOCUMENTS

2005/0150206 A1   7/2005  Verniau
2007/0235594 A1  10/2007  Wingett et al.
2011/0112705 A1   5/2011  Antraygue
2017/0096236 A1*  4/2017  Nelson .................. B64D 45/00

FOREIGN PATENT DOCUMENTS

EP      0265738    5/1988
EP      2826707    1/2015

OTHER PUBLICATIONS

Search Report dated Jul. 24, 2018 which issued in the corresponding European Patent Application No. 16862626.5.
Office Action dated Mar. 19, 2019 issued in European Patent Application No. 16862626.5.

* cited by examiner

PRECISION OPERATOR FOR AN AIRCRAFT AUTOTHROTTLE OR AUTOPILOT SYSTEM WITH ENGINE PERFORMANCE ADJUST

CROSS-REFERENCE TO RELATED APPLICATION

This application is a continuation-in-part of U.S. patent application Ser. No. 15/554,642 which was filed with the U.S. Patent and Trademark Office on Aug. 30, 2017, which claims priority of PCT/US2016/045002, entitled "Precision Operator for an Aircraft Autothrottle or Autopilot System," filed Aug. 1, 2016, and claims priority to U.S. Provisional Patent Application No. 62/250,819, entitled "Precision Operator for an Aircraft Autothrottle or Autopilot System," filed Nov. 4, 2015; and U.S. Provisional Patent Application No. 62/336,200, entitled "Precision Operator for an Aircraft Autothrottle or Autopilot System," filed May 13, 2016, all of which are incorporated herein by reference in their entirety.

FIELD OF THE INVENTION

The disclosed embodiments relate to an aircraft autopilot system. In particular, the disclosed embodiments relate to a precision operator for an aircraft autopilot system, and more specifically to an arrangement by which selective control for automated mechanical adjustment of aircraft throttle controls and/or aircraft flight control surfaces can be effected while accommodating ready manual override of the automated operator when deemed necessary or otherwise at the behest of the pilot or other operator of the aircraft. Specifically, the autothrottle will handle a rapid decrease or increase of power in a regulated manner despite a vehicle operator's attempt to override the autothrottle in certain situations, such as a go round.

BACKGROUND OF THE INVENTION

Aircraft flight decks have become increasingly sophisticated and rely to a large extent on technology and automated controls that have significantly reduced pilot workload and enhanced systems reliability and efficiency and, as such, passenger safety. In addition to advanced navigation capabilities provided by, for example, GPS and graphical displays that contribute to greatly improve situational and operational status awareness, advances in autopilot systems have proven of tremendous assistance to pilots in maintaining both aircraft control and the smooth and efficient operation of those aircraft that are provided with such capabilities.

Autopilot systems provide functions that range from, at the lowest end of the range of capabilities, simple wing leveling to, in more advanced systems, aircraft directional and course control to maintain and track a selected course, altitude maintenance and adjustment control, and adjustments to the aircraft throttle(s) to maintain and effect desired changes in aircraft velocity.

Automated control of the aircraft throttle(s), in particular, presents special problems that have, in the past, limited such capabilities to only the largest or, at least, the most technologically complex and advanced aircraft, such as large commercial airline passenger jets, advanced regional and general aviation jets, and high-end turbine propeller airplanes. Such autothrottles provide the ability to realize truly automated, hands-off control of the aircraft, thus providing increased aircraft operating efficiencies, reducing cost in, for example, the consumption of fuel, and vastly decreasing pilot workload and thereby notably increasing flight safety.

But providing autothrottle capabilities in an aircraft requires, with the technologies currently in use, physical, spatial and mechanical accommodations that limit this functionality to only the largest and/or most technologically advanced aircraft which, in most cases, must be designed and constructed to include and utilize autothrottle functionality.

In most aircraft, the throttle(s)—which are selectively adjustable to cause the engine(s) to generate a predetermined amount of power or thrust to propel the aircraft at a desired velocity—are adjusted by pilot-controlled manual override displacement of one or more graspable handles on levers that are pivotally mounted for rotation through a limited arc in a throttle quadrant in the aircraft cockpit or flight control deck. These levers are typically connected to the engines or engine controllers by control cables that are longitudinally displaced as the positions of the throttle levers are pivotally adjusted.

In almost any aircraft, not insignificant forces must be applied to the throttle levers—whether manually by a pilot or by an operating motor of an autothrottle system—to vary or adjust the pivoted positions of the levers. The motors of the system, therefore, must be fairly robust, both in size and weight (to provide sufficient torque and operating forces applied to the throttle lever) and in construction (to assure continued reliability through tens of thousands of activations and operations). As a consequence, only aircraft specifically designed and constructed with sufficient clearances and space to accommodate these motors and associated elements at, in and/or alongside the throttles quadrant of the cockpit, and capable of accepting the significant additional weight associated with these systems and their component parts, are able to incorporate such autothrottles into and with their flight controls. There is moreover virtually no ability to retrofit or add autothrottle capabilities into existing aircraft that have not already been specially designed and constructed to accommodate the associated operating components of an autothrottle system.

It is in addition important, to assure safe operation of the aircraft under continued control by the pilot, that the pilot can quickly and easily override or otherwise assume manual control of the throttles from an activated autothrottle system in the event that operating conditions in the aircraft may suddenly require that the pilot assume immediate physical control of the throttles, as in an emergency or any circumstance in which the pilot deems it appropriate, without having to first manually disengage the autopilot or autothrottle system(s). Such circumstances, however may have a detrimental result in that sudden pilot engagement may cause operations of the aircraft throttle control outside of a desired throttle range. Such an occurrence can lead to slow engine responses or even a stalling condition at a worst case scenario. Accordingly, an improved autothrottle is beneficial to deter or prevent pilot operation of an autothrottle outside of a desired operating range.

SUMMARY OF THE INVENTION

The disclosed embodiments are directed to an aircraft autopilot/autothrottle operator arrangement that is compact, lightweight, reliable and readily installable in an aircraft, even in aircraft in which no special accommodation for adding or providing autopilot/autothrottle capabilities have been designed into or provided for the aircraft, and which can be safely and easily overridden by a pilot wishing to quickly assume manual control of the throttle(s) when under the control of the autopilot/autothrottle system. The disclosed embodiments provide such an operator arrangement that can also be applied, with like advantageous functionality, as part of or in conjunction with an aircraft autopilot system to control the movements of control surfaces of the aircraft whose variable positions are adjustable to control, for example, the pitch, roll and yaw of the aircraft.

The disclosed embodiments provides an aircraft autopilot/autothrottle operator that exhibits a number of significant advantages over those currently in widespread use. First, the inventive arrangement is relatively lightweight, especially as compared to current autopilot/autothrottle operating arrangements and components. Second, the inventive arrangement is notably simplified, as compared to current autopilot/autothrottle operating arrangements, which can provide significant increases in physical and operating reliability. Third, the inventive arrangement is notably more compact than current autopilot/autothrottle operating arrangements and is therefore installable in a wider range of aircraft of widely varying size. Fourth, the inventive arrangement is based on the use of a linear operator that is activated from a position remote from the throttle handle pivot, thus allowing its installation—either at the time of initial construction or as an add-on or retrofit to an existing structure—in aircraft having a relatively compact throttle quadrant or that have not otherwise been specially designed to accommodate a conventional autopilot/autothrottle and its heavy-duty motors and clutches and which would otherwise be mounted at and proximate the pivot points of the throttle handles. Fifth, the actuator utilized in the inventive arrangement does not require separate or integrated clutches or clutch components and instead provides inherent override capabilities, and neither does it require a series of gears between an operating motor and its attachment to the throttle handle—thereby greatly decreasing complexity, weight and physical space requirements and increasing operating reliability.

In one aspect, the disclosed embodiments provide an autopilot system including a motor configured to impart rotational movement to a shaft extending from the motor, the motor being mounted on a support. An actuator assembly is operatively connected to the shaft and to an attachment end of a throttle lever, the throttle lever having a control end, opposite to the attachment end, for application of manual force. A position sensor is operatively connected between the motor and a moving portion of the actuator assembly. The system further includes an electronic controller configured to control the motor so that it moves the actuator assembly to actuator positions based at least in part on position information received from the position sensor to cause movement of the throttle lever to lever positions. The actuator assembly includes a bearing assembly having a plurality of bearings configured to contact a surface of the shaft for converting rotational movement of the shaft into linear motion of the bearing assembly along the shaft. The actuator assembly further includes a shuttle arm having a mounting surface at a first end configured to attach to the bearing assembly and at least one linkage arm at a second end of the shuttle arm which is operatively coupled to the attachment end of the lever.

The disclosed embodiments may include one or more of the following features. The actuator assembly may be configured so that manual movement of the control end of the throttle lever applies a thrust force to the distal end of the shaft relative to the bearing assembly; and when the thrust force exceeds a threshold, the bearing assembly is configured to slip along the shaft irrespective of any rotation that may be concurrently imparted to the shaft by the motor.

The bearing assembly may be configured to accept the shaft in a throughbore thereof and may include at least one set of bearings, each of the bearings being supported in the bearing assembly to contact the surface of the shaft at determined angles relative to a longitudinal axis of the shaft so as to trace a helical pattern on the surface of the shaft as the shaft moves through the bearing assembly.

The at least one linkage arm at the second end of the shuttle arm may be rotatively coupled to the attachment end of the throttle lever, the at least one linkage arm being positioned parallel to the shaft to allow free movement of a distal end of the shaft as the bearing assembly moves along the shaft.

The system may be installed in an aircraft having two engines and the throttle lever of each engine may be controlled separately. In the event of an engine loss, the power setting of the remaining engine is controlled to stay above stall speed and is further controlled not to exceed an engine power threshold. The engine power threshold may be based at least in part on a maximum power imbalance that can be compensated by action of an aircraft rudder to prevent unwanted rotation of the aircraft.

The disclosed embodiment also implements a method by which an autothrottle adjusts engine performance to substantially conform to preferred performance parameters. One or more sensors monitor engine performance. An engine controller, typically implemented with a microprocessor and memory, uses data from the sensors to detect a condition wherein an actual engine performance differs from a preferred engine performance, referred to as a nonconforming condition. One such condition is a surge condition. Haptic feedback is provided via a throttle lever until the actual engine performance matches the preferred engine performance.

According to one aspect of the invention, the autothrottle is automatically engaged when a nonconforming condition is detected.

According to one aspect of the invention, a tension required to adjust the throttle lever(s) is increased or decreased based at least in part on the nonconforming condition.

BRIEF DESCRIPTION OF THE DRAWINGS

The above and/or other aspects and advantages will become more apparent and more readily appreciated from the following detailed description of the disclosed embodiments taken in conjunction with the accompanying drawings of which.

DETAILED DESCRIPTION

Figure 1:
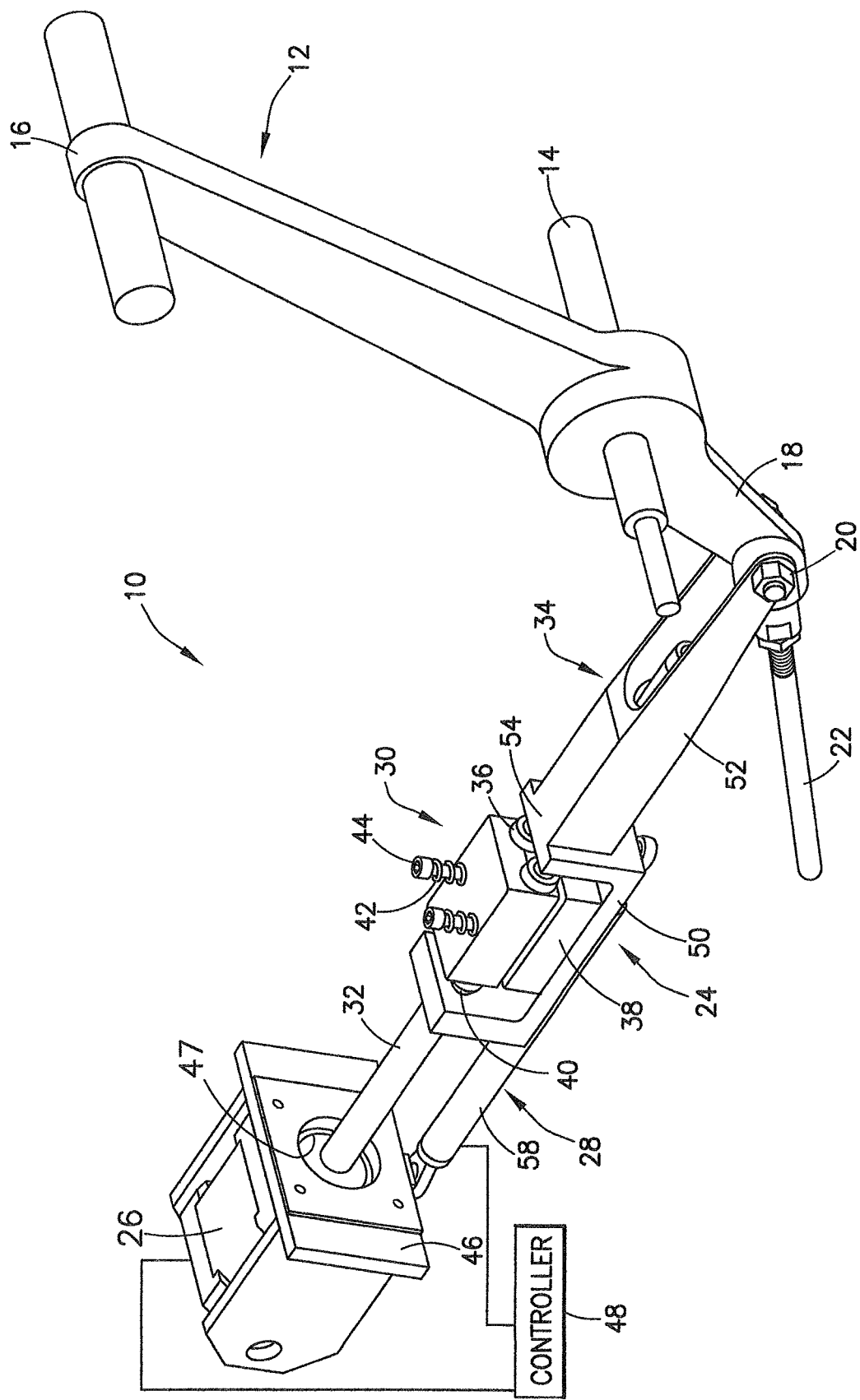
FIG. 1 is an elevated perspective view of an aircraft autothrottle operator and associated elements constructed in accordance with an embodiment of the disclosed invention.
Figure 2:
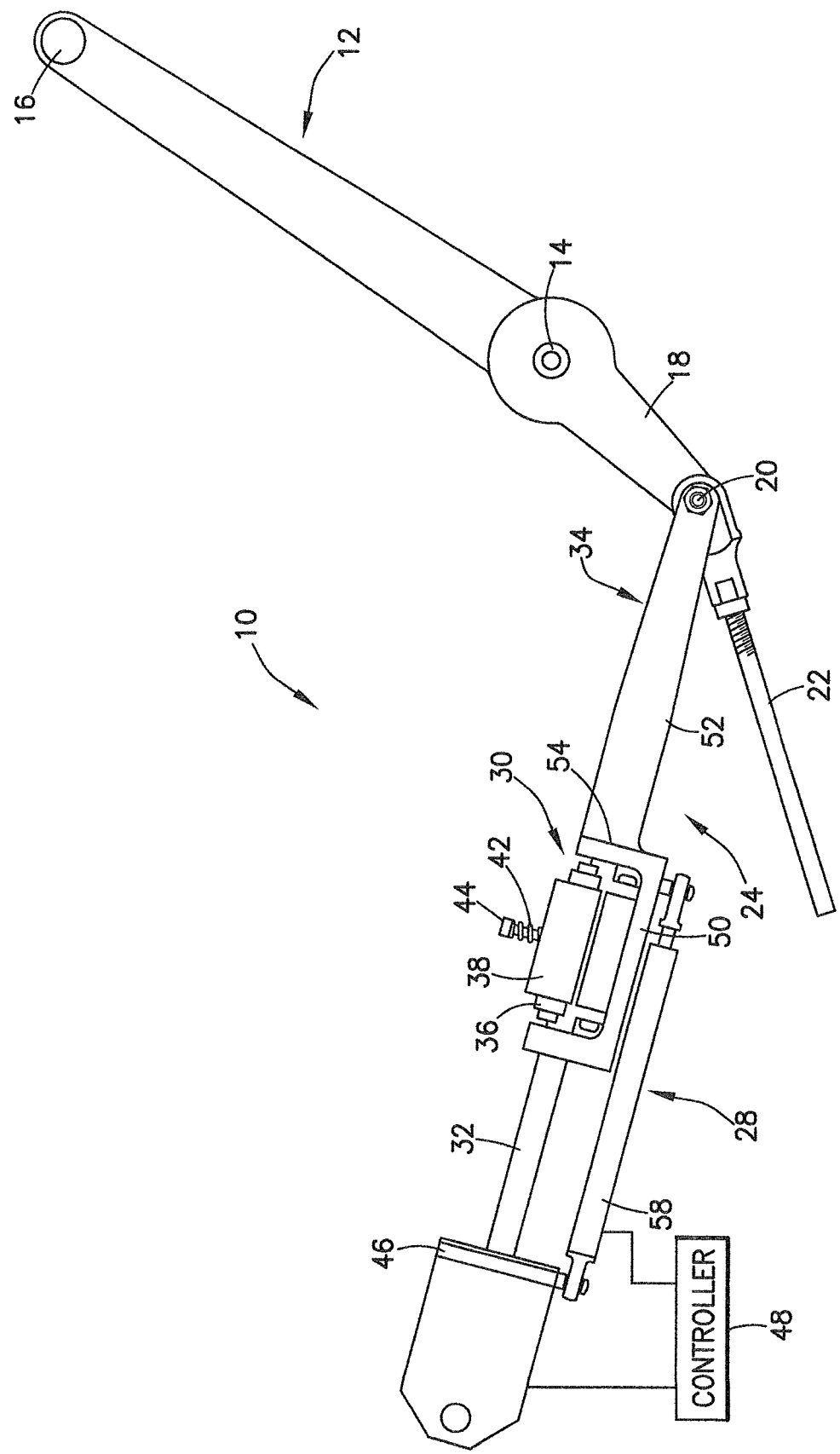
FIG. 2 is a side view of the embodiment of the autothrottle operator depicted in FIG. 1.

FIGS. 1 and 2 present two views of an embodiment of the precision aircraft autothrottle operator. The autothrottle operator system or arrangement, identified in the drawing figures by the general reference numeral 10, is attached for use to a conventional throttle handle or lever 12 of an aircraft. The throttle lever 12, the configuration and construction of which is conventional, is mounted for pivoted movement or displacement about a shaft or other pivot point or fulcrum 14 at which the lever 12 is secured in place at the throttle quadrant (not shown) of the aircraft. The distal end 16 of throttle lever 12 is configured for ease of grasping and manipulation, to advance and retard the lever 12 through its arcuate range of displacement, by a pilot manually controlling the power output of the associated aircraft engine and, thereby, the airspeed or velocity of the aircraft. The opposite or proximal end 18 of throttle lever 12 connects at attachment pin or shaft or point 20 at one end of a cable 22 that itself connects, generally at its far end, to the engine or engine controller associated with lever 12. Thus, pilot manipulation, i.e., counterclockwise (in the figures) advancement or clockwise retarding—of the lever distal end 16 about pivot point 14 causes opposite-sense arcuate motion of attachment point 20, thus effecting linear displacement of cable 22 and corresponding changes in the power output of the associated engine. Aircraft implementations in which the motion-transmitting functionality of cable 22 is instead provided by other elements or systems are known in the art, but changes in the power or thrust generated by an aircraft engine are in any event generally controlled in accordance with sensed displacement of the proximal extension of the corresponding throttle lever.

The autothrottle operator of the embodiment depicted in FIGS. 1 and 2 is formed by an actuator assembly 24, a motor 26, and a position sensor 28.

In particular implementations, actuator assembly 24 comprises an arrangement formed of a bearing assembly 30 (also referred to herein as shuttle body 30), an elongated shaft 32 and a linear fork 34.

The combination of bearing assembly 30 and shaft 32 function to convert rotary motion into linear displacement. In the embodiment depicted in the figures, this functionality is implemented using a commercially-available assembly identified by its manufacturer, Zero-Max, Inc. of Plymouth, Minn. as a Roh'lix Linear Actuator. Six rolling-element bearings 36, in sets of three, are supported in a base block 38 at predetermined angles about a throughbore 40 defined in block 38 and through which shaft 32 extends for longitudinal displacement of block 38 along the shaft (a more detailed view of the block 38 and shaft 32 can be seen in FIG. 4, which is discussed below in the context of the second embodiment). Each of the bearings 36 contacts the surface of shaft 32 at an angle, such that the bearings 36 trace a helical pattern along the shaft and thereby longitudinally displace block 38 along the shaft as the shaft is rotated. Put another way, as the shaft 32 is rotated, i.e., by selective operation of motor 26, the bearings 36 trace out an imaginary screw thread, causing linear longitudinal displacement of block 38 on and along shaft 32. Base block 38 is constructed as two halves that are coupled by the combination of springs 42 and associated screws 44 that are adjusted to selectively setting the thrust force that bearings 36 apply to and against shaft 32 and, correspondingly, the amount of linear force that must be manually applied to the block 38 to overcome the thrust force and allow the bearings 36 to slip longitudinally along the surface of shaft Thus, when the thrust forces set or provided by a predetermined adjustment of screws 44 are exceeded, block 38 slips on and along shaft 32 irrespective of any rotation that may be concurrently imparted to the shaft by, e.g., motor 26.

With continued reference to FIGS. 1 and 2, the operatively-rotated shaft of motor 26 is coupled to the end of shaft 32 remote from block 38. The motor 26 may be, for example, a precision stepper motor that steps in response to the input of pulses or other electrical signals from a diagrammatically-depicted controller 48 through 200 consecutive rotative positions spaced about 1.8 degrees apart. Motor 26 is operable to incrementally (i.e., step-wise) rotate bidirectionally, i.e., selectively in both/either the clockwise and/or counterclockwise directions, based on the operating signals from controller 48. One or more gears may optionally between the motor shaft and shaft 32 if needed or desired to attain a rotational speed of shaft 32 deemed suitable for the particular implementation and/or aircraft. Motor 26 is mounted on a motor bracket 46 having an opening 47 for unimpeded passage of shaft 32 and/or the motor shaft, bracket 46 being itself securable to a fixed structure in the aircraft cockpit to secure the motor 26 against movement as it operatively rotates shaft 32.

Controller 48 may by way of illustration comprise an electronic controller having a processor and memory dedicated to the operation of motor 26 and, optionally, also to associated elements and functionality of the inventive autothrottle system, or its functionality may be incorporated in or as a part of the control system or elements of an autopilot system or of a flight management system or of other avionics and/or automation systems of the aircraft.

Linear fork 34 connects shuttle block 38 to throttle lever attachment point 20. Fork 34, which may be implemented as a unitary element (as described below in the context of the second embodiment), comprises in the illustrated embodiment a shell or tray 50 to which block 38 is secured, a pair of opposed linkage arms 52 that are rotatively coupled at one of their ends to attachment point 20 of the throttle lever, and a web 54 that joins tray 50 to arms 52. The free end portion 56 of shaft 32 that is opposite its coupled connection to motor 26 is freely movable through and relative to apertures, passages and voids and the like that are defined in web 54 to accommodate the shaft end 56 as shuttle block 38 is operatively displaced or "shuttles" along shaft 32.

The current relative displacement or position of shuttle block or body 38 along the elongation of shaft 32 is determined by monitoring changes in the distance or spacing between, by way of illustration, the positionally-fixed motor 26 and the movable shuttle body 38. To provide this functionality, in the illustrated embodiment the position sensor 28 is implemented by a linear potentiometer 58, such as, for example, an MLP miniature linear potentiometer manufactured by Celesco Transducer Products, Inc. of Chatsworth, Calif., that is connected as a position sensor between motor bracket 46 (to which the motor is secured) and tray 50 (on which the shuttle body is mounted). Potentiometer sensor 58 is electrically connected to controller 48 which thereby monitors changes in the linear position of shuttle body 38 (and thus, correspondingly, of the attachment point 20 at the proximal end of the throttle lever) on and along shaft 32. The throttle position is accurately mapped and recorded using the potentiometer sensor 58 when the system is installed in the aircraft. Because the linear actuator is controlled with a stepper motor, a map of the throttle position for an individual step is determined and used as a means of detecting uncommanded movement or slip in the movement due to obstruction of the throttle lever. In particular embodiments, such detection could ultimately result in the system disengaging the autothrottle.

Figure 3:
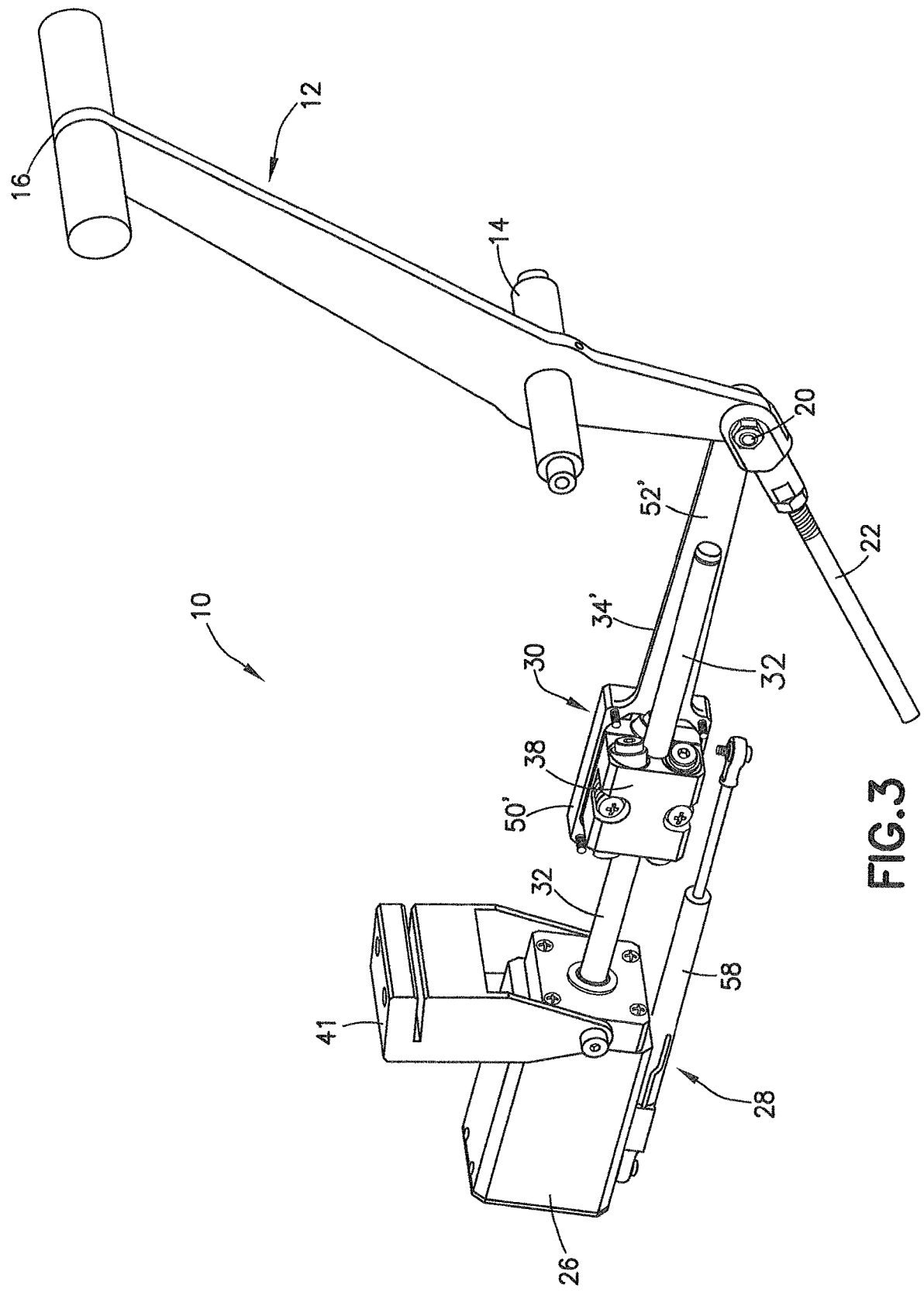
FIG. 3 is a perspective view of a second embodiment of the aircraft autothrottle operator with a housing cover removed.
Figure 4:
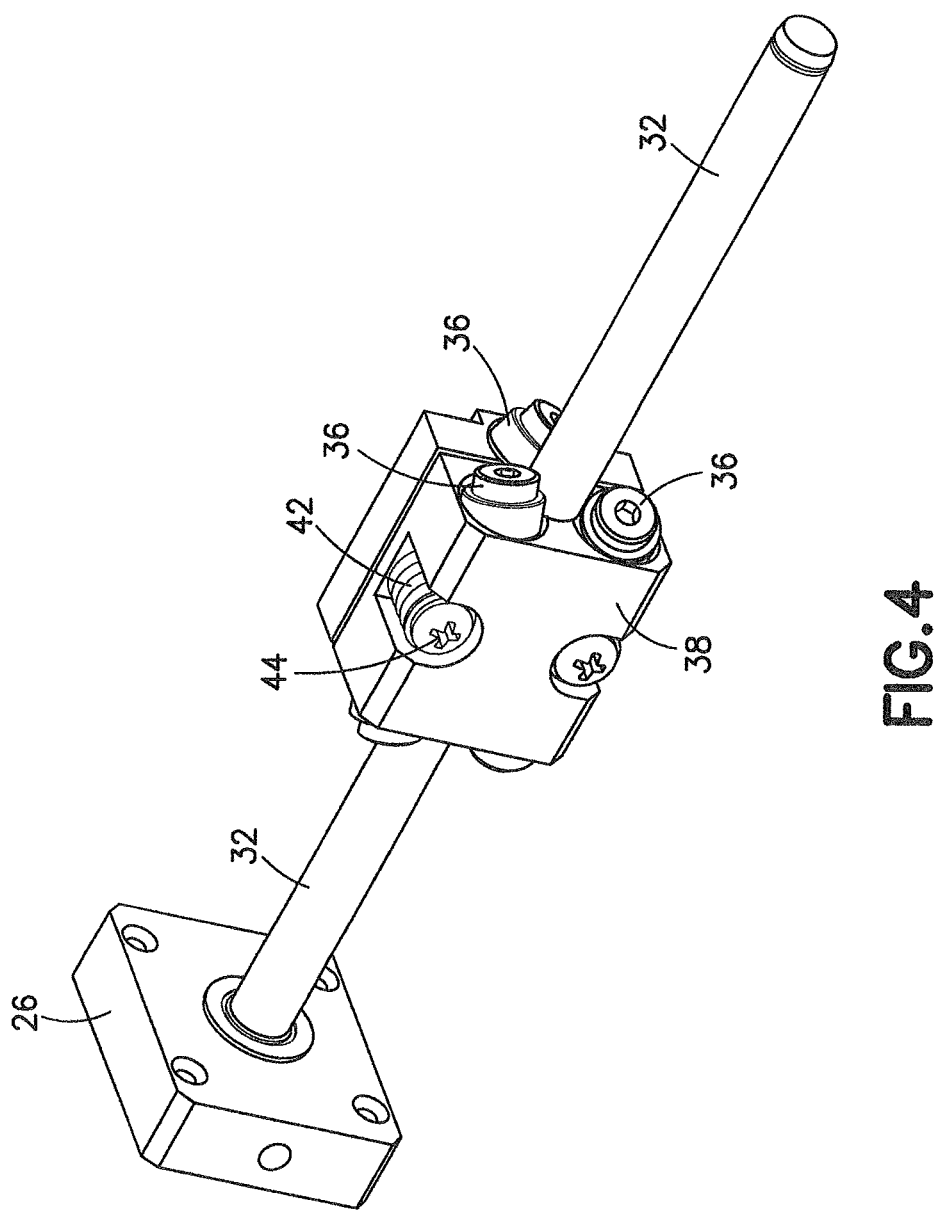
FIG. 4 is an enlarged view of the bearing assembly and shaft of the embodiment of the autothrottle depicted in FIG. 3.
Figure 5:
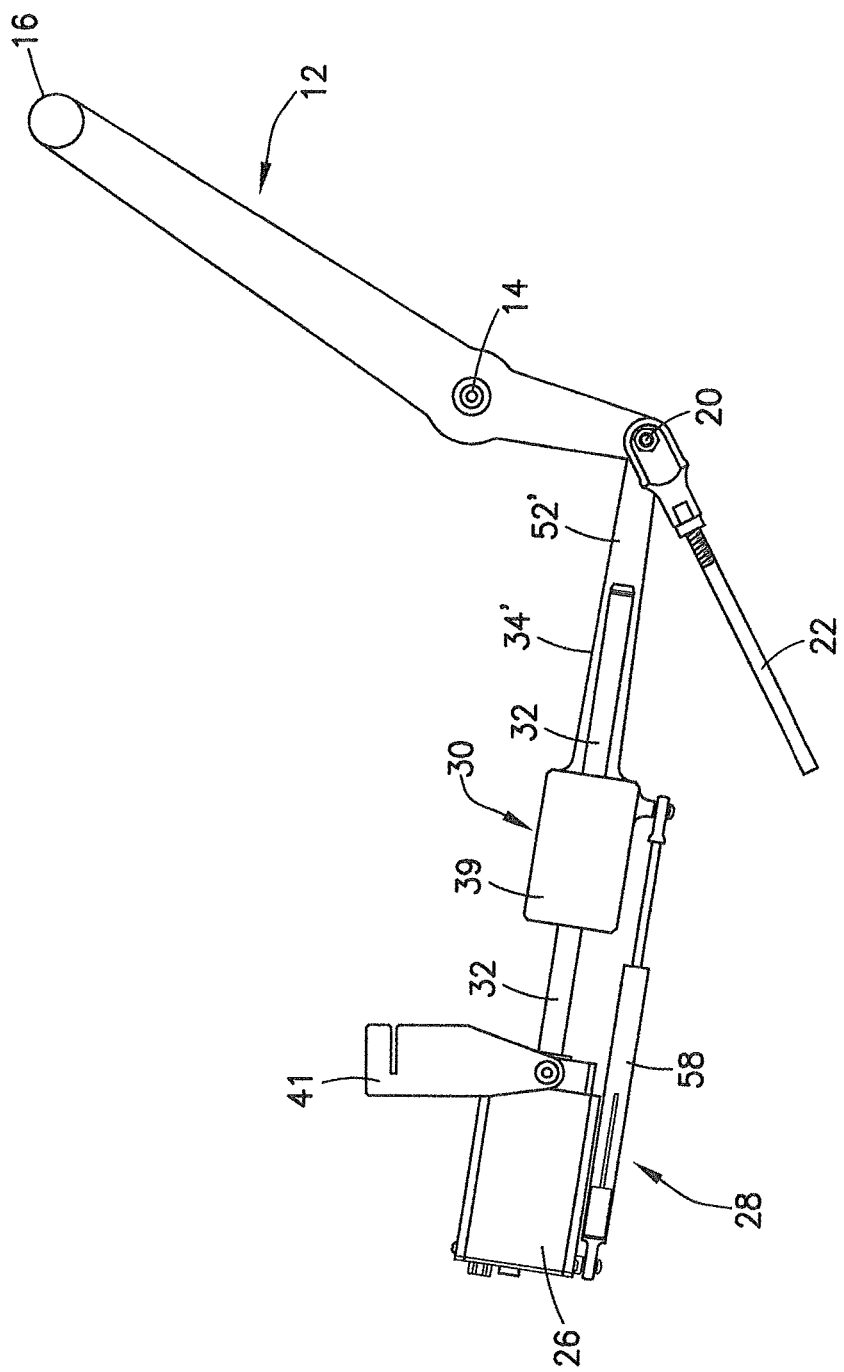
FIG. 5 is a side view of the embodiment of the autothrottle operator depicted in FIG. 3.

FIGS. 3-5 depict a second embodiment of the aircraft autothrottle operator. In this embodiment, the shuttle block 38 is connected to the throttle lever attachment point 20 by a shuttle arm 34' which is implemented as a unitary element, rather than a dual-pronged fork 34, as discussed above (the controller 48 is not shown in these views). The shuttle arm 34' has a shell or tray 50' at one end thereof to which block 38 is secured. The tray 50' is oriented so that a mounting surface of the bearing assembly 30 is oriented in a vertical plane, whereas in the first embodiment, the mounting surface is oriented in a horizontal plane. The motor 26 may be held in place at a pivoting joint of a bracket 41 which can be attached to an interior structure of an aircraft. A detailed view of the block 38 and shaft 32 can be seen in FIG. 4. In FIG. 3, the cover of the housing 39 containing the block 38 is not shown so that the block 38 can be seen in the figure. FIG. 5 shows the housing 39 with its cover in place. At the distal end of the shuttle arm 34' is a linkage arm 52' which is rotatively coupled to attachment point 20 of the throttle lever. The distal, i.e., free end portion 56, of shaft 32 that is opposite its coupled connection to motor 26 is parallel to the linkage arm 52' and therefore can move freely as shuttle block 38 is operatively displaced or "shuttles" along shaft 32.

The basic manner of operation of the inventive autothrottle operator 10, to selectively control an aircraft throttle in an automated operating mode (e.g. under the control of an autopilot system), will now be described. In response to electrical signals from controller 48, stepper motor 26 is operated to selectively rotate coupled shaft 32 in a desired direction (to respectively increase or decrease engine thrust) and, as shaft 32 rotates, shuttle body 38 is linearly displaced along and relative to shaft 32 as the bearings 36 trace a helical path along the surface of rotating shaft 32. This linear displacement of shuttle body 38 is transferred through linkage fork 34 to throttle lever 12 at attachment point 20, causing throttle lever 12 to pivot about its fulcrum 14, just as though throttle lever 12 were being manually moved about fulcrum 14 by a pilot grasping its distal end 16. The resulting displacement of attachment point 20 at the proximal end 18 of throttle lever 12 likewise causes linear displacement of engine control cable 22, thus causing the engine to vary the power output or thrust of the aircraft engine associated with that throttle lever. Thus, as shuttle body 38 is displaced along shaft 32 toward motor 26, throttle lever 12 is rotated counterclockwise (in the Figures) to reduce engine power and, as shuttle block 38 is displaced along shaft 32 away from motor 26, throttle lever 12 is rotated clockwise to increase engine power—again, just as though the throttle lever were being manually adjusted by a pilot grasping the throttle lever at its distal end 16.

Changes in the linear position of shuttle body 38 relative to motor 26—and, correspondingly, of the rotative position of the throttle lever 12—can be determined by controller 48 by monitoring the output of the potentiometer position sensor 58, as can the current position of the shuttle body. However, since it is the function of an autothrottle to vary engine output power to, for example, attain and/or maintain a predetermined airspeed, controller operation of motor 26 to increase or decrease engine power is dependent not so much on the absolute position or relative spacing of shuttle block 38 and motor 26 but, rather, on whether an increase or decrease in engine power (and, thus, whether operation of motor 26) is needed to provide the desired airspeed; accordingly, monitoring of the output of position sensor provides feedback to controller 48 for use in, inter alia, confirming proper operation of the autothrottle system.

An important and highly advantageous feature of the inventive autothrottle system 10, as compared to conventional commercial autothrottle arrangements, is the provision of override capabilities without the use of clutches and their associated apparatus and connections. The capability of the inventive system 10 to be easily overridden for manual pilot control of the throttle(s), when the system 10 is engaged and even while it remains so, is an important and inherent feature of the system 10 and its construction. By physically grasping throttle lever 12 at its distal end 16 and applying sufficient force to advance or retard the throttle, shuttle body 38 is caused (by its coupled connection to the proximal end 18 of lever 12) to slip or slide longitudinally along shaft 32, thus providing manual pilot control of the throttle even if controller 48 were to remain operationally activated to effect rotation of the motor and shaft 32. Of course, it is generally intended that, when manual manipulation of throttle lever 12 is initiated, autothrottle controller 48 will normally be, automatically deactivated from continued operation of motor 26, but the ability to readily assume manual control of the throttle in the event of, for example, a systemic or component failure to easily and immediately override the autothrottle functionality presents a particularly noteworthy improvement in assuring failsafe operation of the aircraft.

As previously described, pilot-effected manual override of the autothrottle arrangement requires that the pilot advance or retard the throttle lever 12 with a force that, at a minimum, exceeds the thrust force that the bearings 36 apply to the surface of shaft 32. Since that thrust force is adjustable by selective rotation of adjustment screws 44 of shuttle body 38, in particular implementations of the inventive arrangement the thrust force is preset to assure that manual override by the pilot is readily available using a reasonable magnitude of pilot-applied force that is deemed suitable for the particular application and for assuring continued safe operation of the aircraft. Setting of the bearings thrust force to a magnitude sufficient to assure linear movement of shuttle body 38 along and in response to rotation of shaft 32 will provide both reliable automated autothrottle control of the throttle and manual override control using reasonable pilot-applied forces on the throttle lever.

For example, a stepper motor contemplated for use in the inventive autothrottle assembly operatively generates a fairly high torque that rotates the shaft 32 to produce, for example, about 12 pounds of torque on the engine throttle control cable 22 (i.e., at the proximal end 18 of throttle lever 12) and about 4 to 6 pounds of force at the distal end 16 of throttle lever 12. This means that, in a typical intended implementation of the system 10, the aircraft pilot can easily override the autothrottle simply by pushing or pulling back, with a force of at least the same 4 to 6 pounds, on the distal end 16 of the throttle lever even if the motor 26 is engaged and operatively rotating the shaft 32 and/or even if the entire assembly is frozen. By manually applying to the throttle lever a force of about or in excess of, e.g., 4 to 6 pounds—which is a relatively small amount not appreciably greater than the force required to manually adjust the throttle lever without an engaged autothrottle—the shuttle body 38 will slip on and longitudinally along shaft 32 whether or not the shaft is being rotated by motor 26 and the pilot will thereby immediately obtain full, unconstrained and unconditional manual control of the throttle. The autothrottle arrangement thus presents an inherently safe system that assures a pilot the ability to readily assume manual control of the aircraft throttle(s) at any time. When combined with or forming an element of an aircraft autopilot system, the autothrottle arrangement 10 provides an intrinsically safe ability to quickly and easily override the forces applied by the autothrottle controller and the autopilot-instructed operations.

The inventive autothrottle arrangement can also be implemented to provide a warning to a pilot in the event that the aircraft is determined to be operating, for example, at too high or too low an airspeed for the current operating conditions or maneuvers of the aircraft. As is known, stepper motors such as the motor 26 generally contemplated for inclusion in the system 10 have (e.g.) three coils which are, in normal use, selectively actuated to cause the motor to bidirectionally rotate its shaft from step to step. In accordance with this embodiment, haptic feedback can be applied to the throttle lever, i.e., in the nature of "stickshaker" functionality—when the controller 48 determines, e.g. by monitoring at least the aircraft airspeed, that the airspeed is approaching the bounds or limits of a predetermined range of values.

Thus, if the controller 48 determines that the aircraft's increasing airspeed is approaching a predetermined safety limit value (e.g. the maximum structural cruising speed of the aircraft), or that its decreasing airspeed is approaching a predetermined minimum limit value (such as the minimum controllable airspeed or stall speed of the aircraft), motor 26 can be operated to cause the throttle lever to oscillate or shake and thereby alert the pilot to the impending unsafe overspeed or underspeed condition. Similarly, by monitoring engine torque, controller 48 can likewise provide a warning to the pilot by applying like haptic feedback through the throttle handle 12 if it is determined that the engine is at or approaching an unsafe operating condition, e.g. excessive torque.

This functionality is implemented by selectively applying electrical signals to individual ones or combinations of the multiple actuating coils of the motor, for example by activating only two of the three coils, or rapidly cycling electrical signals to a selected one or more of the motor coils—and does not require that, at the time of such haptic warning, the autothrottle must be or have been engaged or active to autocontrol the throttle and, thereby, the engine power. Thus, for purposes of this pilot-warning functionality the inventive autothrottle system 10 provides "always-on" sensing and haptic alert capabilities. In any event, if controller 48 senses that no manually-input changes to the position of throttle lever 12 have been applied in response to its haptic warning, the system 10 can be configured to operatively adjust the engine power or torque to correct the airspeed or overtorque condition by suitable motor-driven rotation of shaft 32 and the resulting linear displacement of shuttle body 38 as explained hereinabove.

Accordingly, by implementing this functionality the system 10 can be viewed as always engaged, with controller 48 continuously monitoring relevant characteristics and operating conditions of the aircraft that may warrant or necessitate a warning—delivered with haptic feedback delivered by shaking or oscillating or vibrating the throttle lever 12 and/or the initiation of automated controlled movement of the throttle lever by operation of motor 26 to correct or ameliorate the out of bounds condition.

Another advantageous feature of the inventive autothrottle arrangement is realized in an aircraft having, for example, two (or more) throttle levers each controlling the power output of a corresponding engine. In such multi-engine aircraft, manual control of airspeed, through manipulation of the throttle levers, is effected by concurrently advancing (or retarding) the two (or more) throttle levers. An issue that can arise in manual pilot control of the throttles of such multi-engine aircraft is that if the multiple throttle levers are not adjusted together, i.e., so that each lever is advanced or retarded by about the same amount, the engines may produce different levels of power or torque, as a result of which the propulsion of the aircraft may be unbalanced with one engine producing more thrust or torque than another, as the engine on one wing is producing less (or more) thrust than the engine on the other wing. Similarly, operating characteristics of one engine, with respect to another engine of the aircraft, may result in each engine generating different amounts of thrust or torque even if the respective throttle handles are correspondingly positioned or adjusted.

In a multi-engine aircraft in which an inventive autothrottle system 10 is provided for each of the engines, an imbalance of the thrust or torque produced by the two (or more) engines can be sensed and used by the controller(s) 48 to warn or alert the pilot of the imbalance by haptically shaking or vibrating (or the like) one or both/all of the throttle levers, using the procedure described hereinabove. As previously noted, this functionality does not require that the autothrottle system 10 be in operational use to autocontrol the positions of the throttle levers and, correspondingly, to automatically vary or adjust the thrust or power output of the engines. In addition, as also described above, the system can be configured so that detection that the multiple engines are out of sync or not generating the same levels of thrust or torque will cause the autothrottle system 10 of one or more of the engines to automatically readjust the corresponding throttle lever(s) 12 and thereby equalize the relevant operating characteristics of the multiple engines.

Another advantageous application of the inventive autothrottle arrangement in multi-engine aircraft is warning of and preventing the application of too much thrust to, for example, one of the two engines when one engine fails or is otherwise determined to be generating less than the intended, or expected, thrust. In a (by way of illustrative example) two engine aircraft, the manufacturer will have established an airspeed, VMCA, as the minimum controllable airspeed on a single engine when the aircraft is airborne, i.e., the minimum airspeed at which, with only one of the two engines operating, the pilot will have sufficient rudder authority to prevent the aircraft from yawing to an extent that will cause the aircraft to, in effect, roll over and dive into the ground. Thus, the failure—or degraded performance—of one engine in flight creates an asymmetric thrust condition requiring that the pilot of a multi-engine aircraft immediately level off, apply significant rudder and increase power to the remaining engine to maintain an airspeed at or above VMCA. And where the aircraft airspeed is, when one engine fails, below VMCA—such as in the landing phase of flight when engine power is generally brought back to a fraction of full power or thrust—the application of too much power to the engine that remains in operation will create a dangerous asymmetry in thrust and adverse yaw from which the application of rudder may not enable a safe recovery.

Accordingly, in this further use of the inventive autothrottle arrangement, controller 48 monitors (at least) the current airspeed (and, preferably, the acceleration) of the multi-engine aircraft and continuously calculates, for single engine operation, the maximum safe or allowable thrust that should or can be placed on the remaining engine under current flight and operating conditions. Put another way, the controller 48 continuously calculates, for the current airspeed below VMCA, the allowable power limit (i.e., the maximum safe or permissible generated thrust) for the remaining engine for that airspeed. If the power or thrust being produced by that remaining engine, in accordance with the position of throttle lever 12, is increasing and approaching (or at or beyond) the calculated maximum thrust that the engine should be permitted to produce at the current airspeed, an alarm or warning will be generated by the inventive arrangement 10 by vibrating or oscillating the engine's throttle lever 12 (as described hereinabove) to alert the pilot of the impending or existing over-throttle condition.

If the position of throttle lever 12 is not manually adjusted by the pilot in response to the alert, then the motor 26 of the inventive autothrottle arrangement 10 may under appropriate conditions be operated to adjust the position of the throttle lever (and thus retard the throttle) under control of the system 10, without pilot input and irrespective of whether the autothrottle system 10 had theretofore been operatively controlling the aircraft throttles, and thereby avoid or terminate the over-throttle condition of the operating engine.

This functionality can also be applied to assist the pilot in manually advancing the throttle, in response to the failure of the other engine, by only that amount appropriate to avoid an over-throttle condition of the remaining engine, by providing haptic feedback (by vibrating or oscillating the throttle lever 12) as the allowable thrust limit for the engine is approached; the pilot can proceed to manually advance the throttle lever until it starts to vibrate and, as the aircraft airspeed begins to increase, continue to manually advance the throttle lever until, again, the autothrottle system 10 resumes vibration of the throttle lever. Since the controller 48 is continuously calculating and determining an increasing maximum allowable engine thrust as the airspeed increases, the pilot can continue to manually adjust the throttle lever 12 in accordance with the vibration, or lack thereof, applied to the throttle lever by the autothrottle system 10. In this manner the pilot is continuously guided in manually adjusting the throttle so that the engine is always operating to generate the maximum safe thrust based on the current airspeed and other relevant flight and environmental factors that the controller 48 can monitor.

For this and other implementations and applications of the inventive autothrottle system, the system can itself adjust or vary or scale the magnitude of such haptic vibrations or oscillations of the throttle lever as a function of the urgency of the need for pilot action—so that, for example, the system applies relatively small magnitude vibrations to the throttle lever as the limit value of airspeed or thrust or the like is first approached, with vibrations of increasing magnitude applied to the throttle lever as the limit value continues to be approached and is reached or exceeded.

Accordingly, by implementing this functionality the system 10 can be viewed as always engaged, with controller 48 continuously monitoring relevant characteristics and operating conditions of the aircraft. By, for example, such monitoring, the inventive autopilot system is additionally configured to provide additional advantageous modes of operation, as set forth below.

For example, the system 10 may be configured to provide a Speed Hold Mode. In the speed hold mode the system 10 adjusts the engine thrust to achieve and maintain the selected airspeed.

The system 10 also may be configured to provide a Torque Control Mode, in which the system 10 is configured to adjust the engine thrust to achieve and maintain the selected engine torque.

The system 10 also may be configured to provide a Temperature Limit Control Mode. In this mode, the engine thrust is adjusted to achieve and maintain the selected engine turbine inlet temperature.

The system 10 also may be configured to provide an Engine Protection mode in which the system 10 will adjust engine thrust to keep engine torque, speed and temperature from exceeding pre-defined targets in all modes of operations. In particular embodiments, the autothrottle may be configured to protect the engine from exceeding the limits for one or more of the following: torque, shaft horsepower, engine and propeller speeds, engine temperature, engine pressure ratio.

The system 10 also may be configured to provide a Speed Protection Mode. In this mode, at all times the autopilot system protects the aircraft from over-speed or under-speed by adjustment of the engine thrust.

The system 10 also may be configured to provide a mode in which, during manual manipulation of throttles, if the throttles are moved too rapidly by the pilot such that it could result in an engine power surge, the autopilot mechanism provides a warning to the pilot, e.g., by vibrating the throttle lever.

The system 10 also may be configured to provide a turbulence penetration mode that, when engaged by the pilot, automatically adjusts the power to achieve a turbulence penetration speed calculated based on gross weight and aerodynamic characteristics of the aircraft.

The system 10 also may be configured to provide a mode in which approach and take off speeds are calculated and entered into the speed control mode of the autothrottle. Landing approach speed is typically calculated as a function of gross weight and stall margin and may also include factors such as, for example, wind speed and flap configuration. The system 10 may also calculate and control airspeed to maintain optimum Lift over Drag (L/D), e.g., by using an average Angle Of Attack (AOA) from the aircraft AOA sensor.

The system 10 also may be configured to provide multiple autothrottle modes, such as, for example, automatic, airspeed control, and angle of attack control. In automatic mode, the autothrottle flies the airplane at maximum speed by controlling to the torque limit during initial take off and climb until the temperature becomes critical, at which point the autothrottle controls the engine to the maximum allowed temperature. In particular embodiments the autothrottle may be configured to protect the aircraft from out of limit conditions for one or more of the following: minimum airspeed; maximum angle of attack; and maximum airspeed under normal and turbulence conditions.

The system 10 also may be configured so that when it is installed with an engine that has no protection mechanism such as a full-authority digital engine control (FADEC), the autopilot monitors critical engine parameters, such as, for example, temperature, speed pressure ratio, torque, horse power, etc., and acts to prevent these parameters from exceeding the maximum values.

The system 10 also may be configured so that in the event of an engine power loss in a two engine aircraft, the autopilot manages the power setting of the remaining engine to stay above stall speed. At the same time the system controls the remaining engine to maintain safe operating conditions. In one embodiment, in the event of engine loss the throttle lever for the stalled or inoperative engine will vibrate or provide other haptic feedback to the pilot that the subject throttle lever has no effect.

In one embodiment, the autothrottle addresses a problem occurring from gas generator surges during throttle increase; which is a problem occurring, for example, on Pratt & Whitney turboprops. Specifically, the autothrottle tailors throttle lever performance and response to match or substantially correspond to an ideal or preferred engine performance curve. The autothrottle can be configured to monitor conditions and provide haptic feedback, assume control, be disengaged, or the like.

For turboprops, the prop is turned by blowing hot gas over a turbine. Sudden throttle increase may cause gas generator surges, which causes uneven engine performance. Thus, the throttle needs to be delicately increased to alleviate this problem, according to one aspect of the invention, the autothrottle will automatically resist pilot manipulation of the throttle lever based on monitoring of engine performance and other parameters, thereby making it more difficult for manual control of the throttle lever until an existing gas surge dissipates. It should be noted that the autothrottle will provide haptic feedback or automatically increase throttle lever response if the throttle lever is moved too slowly. If a gas surge condition is detected and the autothrottle is not yet engaged, the autothrottle will automatically engage to counteract the surge condition. Alternatively or in addition, the autothrottle will provide a haptic warning such as vibration of the throttle lever when a surge condition is detected without engaging the throttle.

More particularly, the autothrottle feature will control an increase in the throttle in a regulated manner. This is helpful because the response of the engine is nonlinear such that small increases or decreases of throttle level result in relatively large and disproportionate power changes. Thus, by "mapping" the power performance of the engine and then using that information for throttle control, the throttle can be automatically controlled to optimally perform over the different regions of the engine's power output performance curve. For instances in which the autopilot is not engaged, as the engine performance deviates from the preferred performance curve, the autothrottle will provide haptic feedback to the pilot via the throttle lever to signal to the pilot to adjust the throttle until the throttle engine performance is bought back into alignment with the preferred performance curve of the engine.

In one embodiment, the autothrottle will automatically retard the lever motion to scale the lever motion based on a monitoring of the engine until the gas surge dissipates. In one embodiment, the midrange is slowed down until the surge dissipates. Alternatively, if the autothrottle is not engaged or an autothrottle override is engaged, haptic feedback is provided until the surge condition dissipates. Typically, this situation arises during landing, specifically during a landing abort. When landing is aborted and the aircraft has to make another attempt, the power needs to be increases quickly. However, this will create a power surge which can lead to temporary engine failure. The autothrottle will control the power increase in a regulated manner and engage in high stress situations, such as an aborted landing attempt. A mapping of throttle position and power identifies the problem issues and regulates the response to avoid surge conditions.

In one embodiment, as the engine performance deviates from the performance curve the autothrottle increases or decreases lever tension as required to make the throttle lever easier or harder to adjust so that the engine performance returns to an optimal point on the performance curve. Additionally or alternatively, when the engine performance deviates from the performance curve, a haptic or other warning is provided. Additionally or alternatively, the autothrottle can be automatically engaged or disengaged.

In an aircraft in which an inventive autothrottle system 10 is present, a surge can be sensed and used by the controller(s) 48 to warn or alert the pilot of the surge by haptically shaking, vibrating, or the like, of the throttle lever(s), using the procedure described hereinabove. As previously noted, this functionality does not require that the autothrottle system 10 be in operational use to autocontrol the positions of the throttle levers and, correspondingly, to automatically vary or adjust the thrust or power output of the engines. Rather, the system can be configured so that detection of a surge will cause the autothrottle system to automatically adjust the corresponding throttle lever(s) 12 to control the relevant operating characteristics of the engines. Alternatively, the system can be configured so that detection of a surge will cause the autothrottle system to provide haptic feedback to the corresponding throttle lever(s) 12.

The application of the inventive autothrottle arrangement provides warning of and substantially prevents the surge condition. Controller 48 monitors (at least) the current airspeed (and, preferably, the acceleration) of the aircraft and continuously calculates the maximum safe or allowable thrust that should or can be placed on the engine under current flight and operating conditions. In other words, the controller 48 continuously calculates, for the current airspeed below VMCA, the allowable power limit (i.e., the maximum safe or permissible generated thrust) for the engine for that airspeed. If the power or thrust being produced by that engine, in accordance with the position of throttle lever 12, is increasing and approaching (or at or beyond) the calculated maximum thrust that the engine should be permitted to produce at the current airspeed, an alarm or warning will be generated by the inventive arrangement 10 by vibrating or oscillating the engine's throttle lever 12 (as described hereinabove) to alert the pilot of the impending or existing surge condition.

Figure 6:
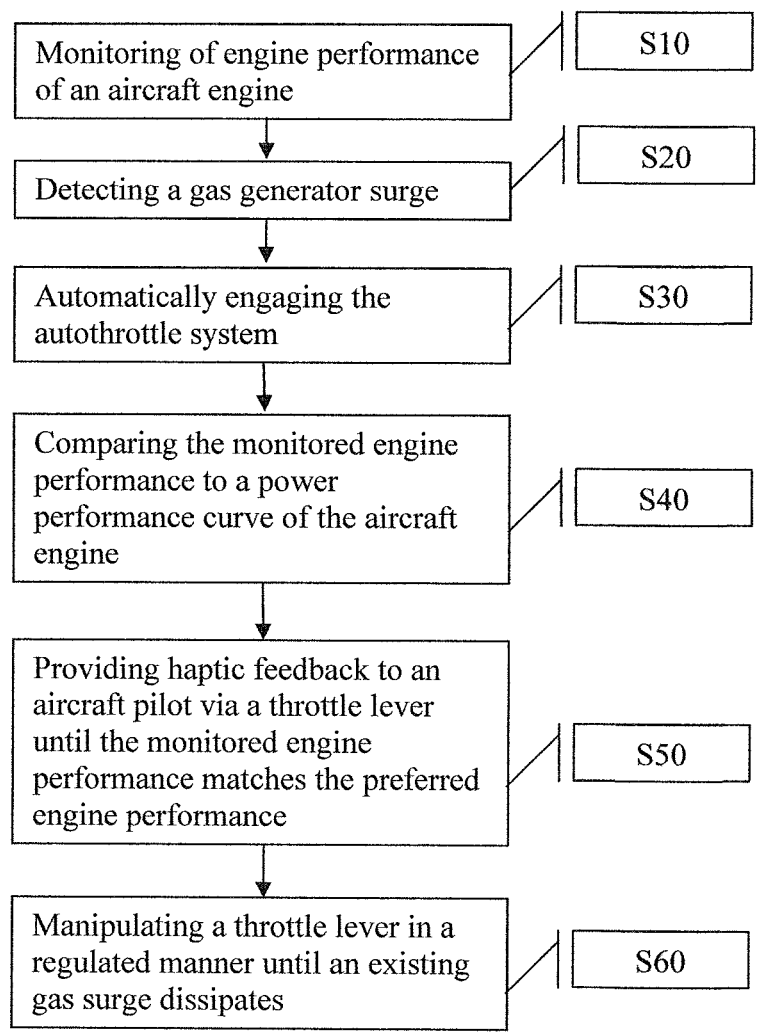
FIG. 6 is a flow chart illustrating a method for operating an autothrottle system for an aircraft.

FIG. 6 is a flow chart for method for operating an autothrottle system for an aircraft. The method includes monitoring engine performance of an aircraft engine (S10). When a gas surge is detected (S20), the autothrottle system is automatically engaged (S30). In one embodiment, the monitored engine performance is compared to a power performance curve of the aircraft engine (S40). The autothrottle provides haptic feedback to an aircraft pilot via a throttle lever until the monitored engine performance matches the preferred engine performance (S50). According to one aspect of the invention, the haptic feedback comprises increasing or decreasing a throttle lever tension. The autothrottle manipulates the throttle lever in a regulated manner until an existing gas surge dissipates (S60). The manipulating of the throttle lever is based on the monitoring of engine performance until the existing gas surge dissipates.

The herein-described and other embodiments of the inventive system, with little or relatively little modification, can also be applied to the automated control of aircraft flight control systems and elements other than the engine throttle controls. For example, the arrangement 10 can be connected or coupled, instead of to the throttle lever, to aircraft control surface elements such as the ailerons, trimtab(s), horizontal stabilizer and rudder to auto-adjust the positions of these flight control surfaces as part of or under the control of the aircraft's autopilot system.

Although example embodiments have been shown and described in this specification and figures, it would be appreciated by those skilled in the art that changes may be made to the illustrated and/or described example embodiments without departing from their principles and spirit.

What is claimed is:

1. An autothrottle system for an aircraft, comprising:
a motor configured to impart rotational movement to a shaft extending from the motor, the motor being mounted on a support;
an actuator assembly operatively connected to the shaft and to an attachment end of a throttle lever, the throttle lever having a control end, opposite to the attachment end, for application of manual force;
a position sensor operatively connected between the motor and a moving portion of the actuator assembly; and
an electronic controller configured to control the motor so that the motor moves the actuator assembly to determined actuator positions based at least in part on position information received from the position sensor to cause movement of the throttle lever,
wherein the actuator assembly comprises:
  a bearing assembly having a plurality of bearings configured to contact a surface of the shaft for converting rotational movement of the shaft into linear motion of the bearing assembly along the shaft; and
  a shuttle arm having a mounting surface at a first end configured to attach to the bearing assembly and at least one linkage arm at a second end of the shuttle arm which is operatively coupled to the attachment end of the lever,
wherein when a condition exists such that an actual engine performance differs from a preferred engine performance the autothrottle increases or decreases the throttle lever in a regulated manner for optimal performance over different regions of an engine's power output.

2. The autothrottle system of claim 1, wherein the actuator assembly is configured to provide a haptic alert of the condition.

3. The autothrottle system of claim 1, wherein the controller is configured to cause the throttle lever to shake to provide haptic feedback to a user under a defined condition.

4. The autothrottle system of claim 3, wherein the defined condition comprises a surge condition.

5. The autothrottle system of claim 4, wherein the controller is configured to cause the throttle lever to shake under the defined condition irrespective of whether the autothrottle system has been engaged to control the position of the throttle lever.

6. The autothrottle system of claim 4, wherein the controller is configured to move the throttle lever so as to counteract the defined condition.

7. The autothrottle system of claim 1, wherein:
the system is installed in an aircraft having a turboprop.

8. A method for operating an autothrottle system for an aircraft, comprising:
monitoring of engine performance of an aircraft engine;
detecting a gas surge;
automatically engaging the autothrottle system; and
manipulating a throttle lever in a regulated manner until an existing gas surge dissipates.

9. The method for operating an autothrottle according to claim 8, wherein the manipulating of the throttle lever is based on the monitoring of engine performance until the existing gas surge dissipates.

10. The method for operating an autothrottle according to claim 8,
wherein the manipulating of the throttle lever comprises comparing the monitored engine performance to a power performance curve of the aircraft engine.

* * * * *